US010518627B2

United States Patent
Nagpal et al.

(10) Patent No.: US 10,518,627 B2
(45) Date of Patent: Dec. 31, 2019

(54) ELECTRIC MACHINE INTEGRATED AXLE ASSEMBLIES FOR ELECTRIFIED VEHICLES

(71) Applicant: FORD GLOBAL TECHNOLOGIES, LLC, Dearborn, MI (US)

(72) Inventors: Sahil Nagpal, Dearborn Heights, MI (US); Steven Michael Cyr, Lake Orion, MI (US); Robert Howard Saunders, Jr., Oak Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/000,139

(22) Filed: Jun. 5, 2018

(65) Prior Publication Data

US 2019/0366834 A1     Dec. 5, 2019

(51) Int. Cl.
| | |
|---|---|
| *B60K 7/00* | (2006.01) |
| *B60G 11/04* | (2006.01) |
| *B62D 25/08* | (2006.01) |
| *B60G 21/055* | (2006.01) |
| *B60K 17/16* | (2006.01) |

(Continued)

(52) U.S. Cl.
CPC ............ *B60K 7/0007* (2013.01); *B60G 11/04* (2013.01); *B60G 21/055* (2013.01); *B60K 17/16* (2013.01); *B62D 25/082* (2013.01); *B60B 35/122* (2013.01); *B60B 35/14* (2013.01); *B60G 2204/121* (2013.01); *B60G 2204/129* (2013.01)

(58) Field of Classification Search
CPC .... B60K 7/0007; B60K 17/16; B60G 21/055; B60G 11/04; B60G 2204/129; B60G 2204/121; B62D 25/082; B60B 35/122; B60B 35/14
See application file for complete search history.

(56) References Cited

U.S. PATENT DOCUMENTS 3,858,525 A * 1/1975 Butine ...................... B61C 9/38
                                                       105/136
4,475,618 A * 10/1984 Kennedy .................. B62K 9/00
                                                       180/237

(Continued)

FOREIGN PATENT DOCUMENTS

| CN | 104228564 A | 12/2014 |
|---|---|---|
| CN | 205097829 U | 3/2016 |

(Continued)

OTHER PUBLICATIONS

Dana axle advertisement.

(Continued)

*Primary Examiner* — Jacob B Meyer
(74) *Attorney, Agent, or Firm* — David B. Kelley; Carlson, Gaskey & Olds (57) ABSTRACT

This disclosure details electrified vehicle drive systems equipped with electric machine integrated axle assemblies. An exemplary electrified vehicle drive system includes a leaf spring assembly and an axle assembly mounted to the leaf spring assembly. The axle assembly may include a cradle and an electric machine mounted within the cradle. Shocks and stabilizer bar assemblies may extend between the cradle and a vehicle frame of the electrified vehicle.

10 Claims, 4 Drawing Sheets

(51) Int. Cl.
*B60B 35/12* (2006.01)
*B60B 35/14* (2006.01)

(56) References Cited

U.S. PATENT DOCUMENTS

| | | | | |
|---|---|---|---|---|
| 5,443,130 A * | 8/1995 | Tanaka | | B60K 1/00 180/65.6 |
| 6,727,620 B2 * | 4/2004 | White | | B60K 7/0007 310/112 |
| 6,935,451 B2 * | 8/2005 | Bell | | B60K 6/26 180/65.25 |
| 7,112,155 B2 * | 9/2006 | Keuth | | B60K 1/02 475/6 |
| 7,255,187 B2 * | 8/2007 | Bell | | B60K 6/26 180/65.25 |
| 7,314,105 B2 * | 1/2008 | Varela | | B60K 7/0007 180/242 |
| 7,363,995 B2 * | 4/2008 | Downs | | B60K 7/0007 180/292 |
| 7,610,979 B1 * | 11/2009 | Dykowski | | B62K 5/027 180/210 |
| 7,984,782 B2 * | 7/2011 | Platt | | B60K 17/16 180/217 |
| 8,042,639 B2 * | 10/2011 | Platt | | B60K 17/16 180/217 |
| 8,091,677 B2 * | 1/2012 | Murty | | B60L 58/12 180/293 |
| 8,177,014 B2 * | 5/2012 | Platt | | B60K 17/16 180/217 |
| 8,261,870 B2 * | 9/2012 | Johnson | | B60K 17/16 180/217 |
| 8,292,016 B1 * | 10/2012 | Johnson | | B60K 17/16 180/217 |
| 8,460,149 B1 * | 6/2013 | Chemelli | | F16H 48/40 475/230 |
| 8,517,140 B2 * | 8/2013 | West | | B60G 3/20 180/360 |
| 8,584,789 B2 * | 11/2013 | Dusi | | B60B 5/1216 180/300 |
| 8,596,403 B2 * | 12/2013 | Cunningham | | B60K 1/00 180/291 |
| 8,607,915 B2 * | 12/2013 | Johnson | | B60K 17/16 180/217 |
| 8,640,801 B2 * | 2/2014 | Hennings | | B60K 7/0007 180/65.6 |
| 8,657,365 B2 * | 2/2014 | Amano | | B60K 1/00 296/187.11 |
| 8,720,636 B2 * | 5/2014 | Akoum | | B60K 1/00 180/299 |
| 8,800,699 B2 * | 8/2014 | Chodura | | B60K 7/0007 180/65.1 |
| 8,936,130 B2 * | 1/2015 | Hirashita | | B60K 1/00 180/291 |
| 8,991,530 B2 * | 3/2015 | Langer | | B60K 1/00 180/312 |
| 8,998,230 B2 * | 4/2015 | Lee | | B60G 7/001 280/124.128 |
| 9,045,029 B2 * | 6/2015 | Mair | | B60K 7/0007 |
| 9,132,723 B2 * | 9/2015 | Munster | | B60K 7/0007 |
| 9,132,879 B2 * | 9/2015 | Yelvington | | B62K 11/02 |
| 9,145,961 B2 * | 9/2015 | Suzuki | | B60K 6/448 |
| 9,221,496 B2 * | 12/2015 | Barr | | B62D 21/11 |
| 9,248,733 B2 * | 2/2016 | Mair | | B60K 11/00 |
| 9,573,452 B2 * | 2/2017 | Agnew | | B60K 1/00 |
| 9,649,923 B2 * | 5/2017 | Perlo | | B60K 1/00 |
| 9,821,650 B2 * | 11/2017 | Falls | | B60K 1/00 |
| 10,029,551 B2 * | 7/2018 | Ito | | B60K 1/04 |
| 10,252,609 B2 * | 4/2019 | Falls | | B60K 1/02 |
| 2003/0067234 A1 * | 4/2003 | White | | B60K 7/0007 310/112 |
| 2005/0124451 A1 * | 6/2005 | Morikawa | | B60K 17/046 475/6 |
| 2006/0054368 A1 * | 3/2006 | Varela | | B60K 7/0007 180/65.51 |
| 2008/0078603 A1 * | 4/2008 | Taji | | B60K 1/00 180/312 |
| 2008/0179116 A1 * | 7/2008 | Ikenoya | | B60G 3/20 180/63 |
| 2009/0014223 A1 * | 1/2009 | Jones | | B60K 17/16 180/65.8 |
| 2009/0242289 A1 * | 10/2009 | Murty | | B60L 58/12 180/65.265 |
| 2010/0108417 A1 * | 5/2010 | Gilmore | | B60K 6/448 180/65.51 |
| 2011/0000721 A1 * | 1/2011 | Hassett | | B60K 6/48 180/65.22 |
| 2011/0079978 A1 * | 4/2011 | Schreiner | | B60G 3/20 280/124.1 |
| 2011/0169240 A1 * | 7/2011 | Schreiner | | B60G 3/20 280/124.11 |
| 2011/0209934 A1 * | 9/2011 | Armbruster | | B60K 7/0007 180/65.25 |
| 2011/0218073 A1 * | 9/2011 | Platt | | B60K 17/16 475/220 |
| 2011/0259657 A1 * | 10/2011 | Fuechtner | | B60K 6/52 180/65.21 |
| 2012/0040795 A1 * | 2/2012 | Platt | | B60K 17/16 475/220 |
| 2012/0103708 A1 * | 5/2012 | Hennings | | B60K 7/0007 180/65.6 |
| 2012/0118652 A1 * | 5/2012 | Yamamoto | | B60K 6/52 180/65.6 |
| 2012/0142474 A1 * | 6/2012 | Troennberg | | B60K 1/00 475/149 |
| 2012/0142487 A1 * | 6/2012 | Winter | | B60K 1/00 475/332 |
| 2012/0143426 A1 * | 6/2012 | Yamamoto | | B60L 50/61 701/22 |
| 2012/0192396 A1 * | 8/2012 | Platt | | B60K 17/16 29/402.08 |
| 2012/0255803 A1 * | 10/2012 | Platt | | B60K 17/16 180/217 |
| 2012/0258831 A1 * | 10/2012 | Knoblauch | | B60K 1/02 475/5 |
| 2013/0075183 A1 * | 3/2013 | Kochidomari | | B60K 7/0007 180/292 |
| 2013/0105241 A1 * | 5/2013 | Christian | | B60K 17/12 180/337 |
| 2013/0192400 A1 * | 8/2013 | Dodo | | B60K 1/00 74/421 A |
| 2013/0240273 A1 * | 9/2013 | Langer | | B60K 1/00 180/55 |
| 2013/0306394 A1 * | 11/2013 | Theodore | | B62D 21/02 180/291 |
| 2014/0014422 A1 * | 1/2014 | Hirashita | | B60K 1/00 180/65.6 |
| 2014/0051538 A1 * | 2/2014 | Wenthen | | B60K 1/00 475/150 |
| 2014/0182954 A1 * | 7/2014 | Weber | | B60K 17/16 180/65.7 |
| 2014/0262588 A1 * | 9/2014 | Bruns | | B60K 1/00 180/291 |
| 2014/0284120 A1 * | 9/2014 | Cao | | B62D 7/144 180/24.07 |
| 2014/0375011 A1 * | 12/2014 | Lee | | B60G 7/001 280/124.13 |
| 2015/0119181 A1 * | 4/2015 | Fox | | B60K 1/00 475/150 |
| 2015/0367705 A1 * | 12/2015 | Schmitt | | B60G 11/50 280/124.106 |
| 2016/0039277 A1 * | 2/2016 | Falls | | B60K 1/02 180/62 |
| 2016/0347159 A1 * | 12/2016 | Perlo | | B60K 1/00 |
| 2017/0305253 A1 * | 10/2017 | Perlo | | B60K 1/00 |
| 2017/0320384 A1 * | 11/2017 | Kochidomari | | B60K 7/0007 |
| 2017/0341503 A1 * | 11/2017 | Idelevitch | | B60L 50/00 |
| 2018/0099556 A1 * | 4/2018 | Falls | | B60K 1/02 |
| 2018/0237076 A1 * | 8/2018 | Perlo | | B60L 50/66 |

(56) References Cited

U.S. PATENT DOCUMENTS

| | | | | |
|---|---|---|---|---|
| 2018/0297469 A1* | 10/2018 | Liu | ........................ | B60K 17/04 |
| 2018/0345786 A1* | 12/2018 | Kucharski | ............... | B60B 35/14 |
| 2018/0361843 A1* | 12/2018 | Kochidomari | ....... | B60K 7/0007 |
| 2019/0135065 A1* | 5/2019 | Wolf-Monheim | ..... | B60G 5/053 |

FOREIGN PATENT DOCUMENTS

| | | | |
|---|---|---|---|
| FR | 2962375 | B1 | 8/2012 |
| FR | 2977837 | B1 | 2/2014 |
| JP | 2001001774 | A * | 1/2001 |
| JP | 5552961 | B2 | 6/2014 |

OTHER PUBLICATIONS

Scalable electric drive for buses, trucks etc., Research News / Feb. 2, 2015, https://www.faunhofer.de/en/press/research-news/2015/february/scalable-electric-drive-for-buses.html.

\* cited by examiner

ELECTRIC MACHINE INTEGRATED AXLE ASSEMBLIES FOR ELECTRIFIED VEHICLES

TECHNICAL FIELD

This disclosure relates to electrified vehicle drive systems that include electric machine integrated axle assemblies.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines (e.g., electric motors). Conventional motor vehicles, by contrast, rely exclusively on the internal combustion engine to propel the vehicle. A high voltage traction battery pack typically powers the electric machines and other electrical loads of the electrified vehicle.

The electric machines of electrified vehicles are typically connected to transmission gearboxes that include relatively complex gearing arrangements. Simple and cost effective solid axle designs that integrate the electric machines have not been successfully implemented on electrified vehicles.

SUMMARY

A drive system for an electrified vehicle according to an exemplary aspect of the present disclosure includes, among other things, a leaf spring assembly and an axle assembly mounted to the leaf spring assembly. The axle assembly includes a cradle, an electric machine mounted within the cradle, a shaft housing mounted to the cradle, and an axle shaft inserted through the shaft housing and connected to an output shaft of the electric machine.

In a further non-limiting embodiment of the foregoing drive system, the axle assembly is mounted to the leaf spring assembly by a U-clamp.

In a further non-limiting embodiment of either of the foregoing drive systems, the cradle is comprised of a plurality of tubular member that are arranged to establish a top frame, a bottom frame, a first side wall, and a second side wall.

In a further non-limiting embodiment of any of the foregoing drive systems, a first damper is positioned between the electric machine and the first side wall and a second damper is positioned between the electric machine and the second side wall.

In a further non-limiting embodiment of any of the foregoing drive systems, a shock is mounted to a mounting bracket of the cradle.

In a further non-limiting embodiment of any of the foregoing drive systems, a strut is mounted to a mounting pad of the shaft housing.

In a further non-limiting embodiment of any of the foregoing drive systems, a stabilizer bar assembly is connected to the cradle and the shaft housing.

In a further non-limiting embodiment of any of the foregoing drive systems, a flexible wiring harness of the electric machine connects to a battery pack of the drive system.

In a further non-limiting embodiment of any of the foregoing drive systems, the electric machine is an electric motor with an integrated differential.

In a further non-limiting embodiment of any of the foregoing drive systems, the output shaft of the electric machine interfaces with a first side wall of the cradle and the integrated differential interfaces with a second side wall of the cradle.

An electrified vehicle according to another exemplary aspect of the present disclosure includes, among other things, a vehicle frame, a leaf spring assembly mounted to the vehicle frame, and an axle assembly mounted to the leaf spring assembly. The axle assembly includes a cradle and an electric machine mounted to the cradle, a shock extending between the cradle and the vehicle frame, and a stabilizer bar assembly extending between the cradle and the vehicle frame.

In a further non-limiting embodiment of the foregoing electrified vehicle, the leaf spring assembly is mounted to a longitudinally extending frame member of the vehicle frame by a first mounting bracket and a second mounting bracket.

In a further non-limiting embodiment of either of the foregoing electrified vehicles, the axle assembly is mounted to the leaf spring assembly by a U-clamp.

In a further non-limiting embodiment of any of the foregoing electrified vehicles, the U-clamp is received around a leaf spring of the leaf spring assembly and is secured to a mounting pad of a shaft housing of the axle assembly.

In a further non-limiting embodiment of any of the foregoing electrified vehicles, the shock extends between a mounting bracket of the cradle and a frame member of the vehicle frame.

In a further non-limiting embodiment of any of the foregoing electrified vehicles, the stabilizer bar assembly is connected to the cradle and a shaft housing of the axle assembly.

In a further non-limiting embodiment of any of the foregoing electrified vehicles, the stabilizer bar assembly includes a stabilizer bar connected to the cradle and a stabilizer link extending from the cradle to the vehicle frame.

In a further non-limiting embodiment of any of the foregoing electrified vehicles, a strut is mounted to a shaft housing of the axle assembly and a frame member of the vehicle frame.

In a further non-limiting embodiment of any of the foregoing electrified vehicles, a first damper is positioned between the electric machine and a first side wall of the cradle and a second damper is positioned between the electric machine and a second side wall of the cradle.

In a further non-limiting embodiment of any of the foregoing electrified vehicles, the electric machine is an electric motor with an integrated differential.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrified vehicle drive systems equipped with electric machine integrated axle assemblies. An exemplary electrified vehicle drive system includes a leaf spring assembly and an axle assembly mounted to the leaf spring assembly. The axle assembly may include a cradle and an electric machine mounted within the cradle. Shocks and stabilizer bar assemblies may extend between the cradle and a vehicle frame of the electrified vehicle. These and other features are discussed in greater detail in the following paragraphs of this detailed description.

Figure 1:
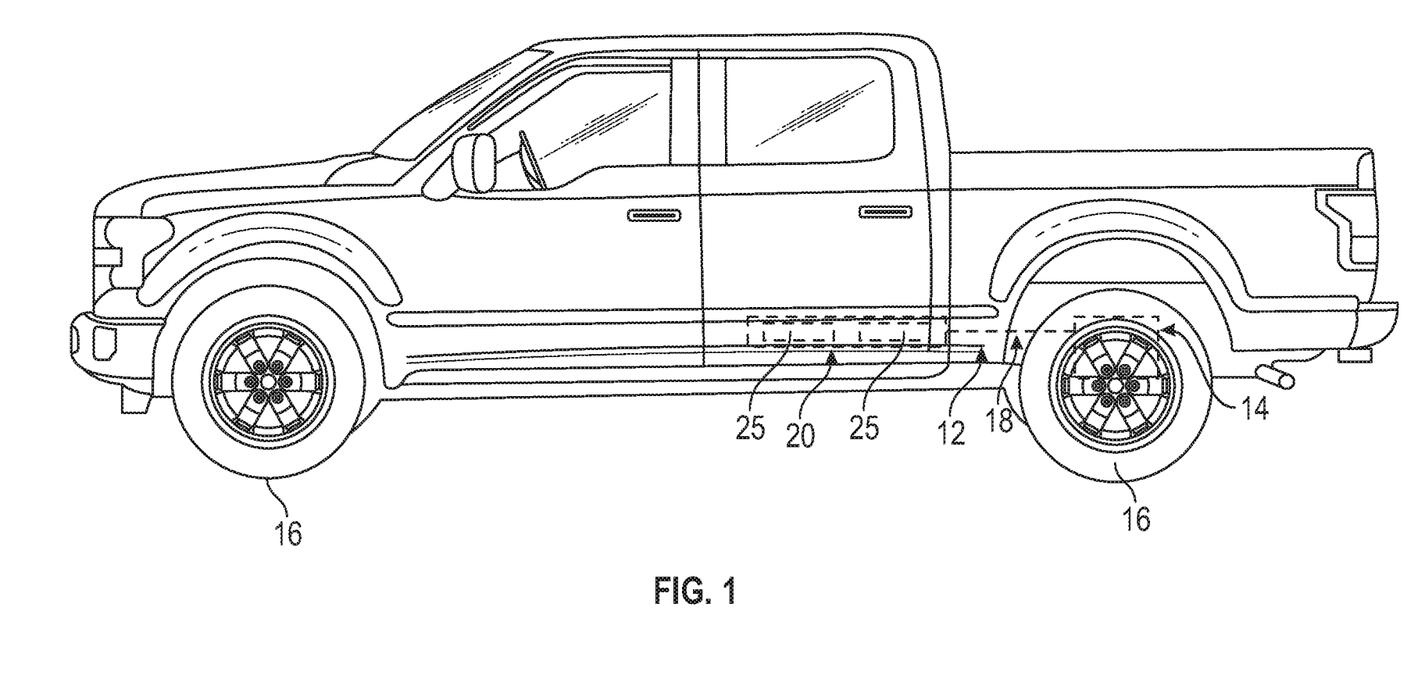
FIG. 1 schematically illustrates an electrified vehicle.

FIG. 1 schematically illustrates an electrified vehicle 10 that includes an electrified drive system 12. In an embodiment, the electrified vehicle 10 is a battery electric vehicle (BEV). In another embodiment, the electrified vehicle 10 is a hybrid electric vehicle (HEV) or a plug-in hybrid electric vehicle (PHEV). Therefore, although not shown in this embodiment, the electrified vehicle 10 could be equipped with an internal combustion engine that can be employed either alone or in combination with other energy sources to propel the electrified vehicle 10.

In the illustrated embodiment, the electrified vehicle 10 is a full electric vehicle propelled solely through electric power, such as by one or more electric machines 14, without any assistance from an internal combustion engine. The electric machine 14 may operate as an electric motor, an electric generator, or both. The electric machine 14 receives electrical power and provides a rotational output torque to one or more drive wheels 16.

A voltage bus 18 electrically connects the electric machine 14 to a battery pack 20. The battery pack 20 is an exemplary electrified vehicle battery. The battery pack 20 may be a high voltage traction battery pack that includes a plurality of battery arrays 25 (i.e., battery assemblies or groupings of rechargeable battery cells) capable of outputting electrical power to operate the electric machine 14 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be a car, a van, a sport utility vehicle, or any other type of vehicle. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily to scale, and some features may be exaggerated or minimized to show certain details of a particular component.

Figure 2:
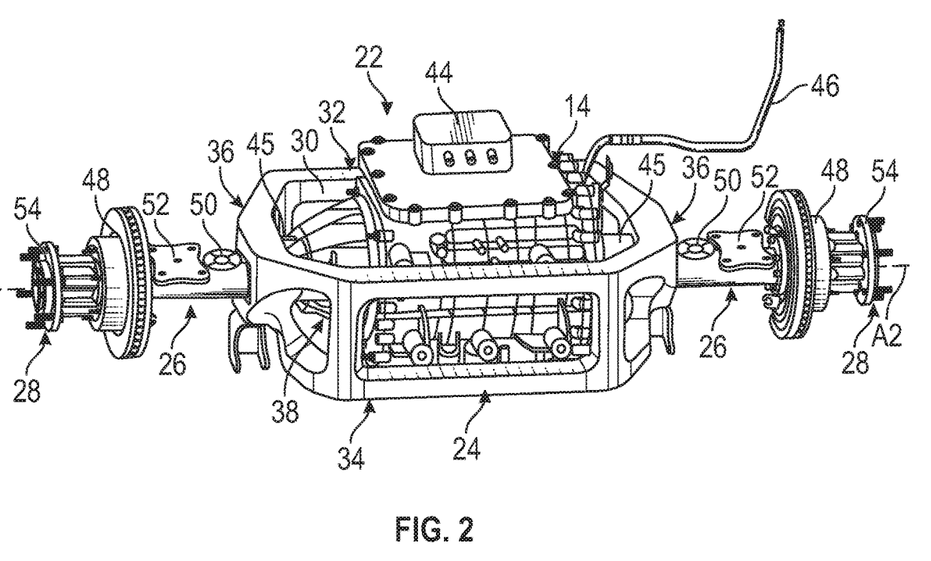
FIG. 2 illustrates an axle assembly of a drive system of the electrified vehicle of FIG. 1. The exemplary axle assembly includes an integrated electric machine.
Figure 3:
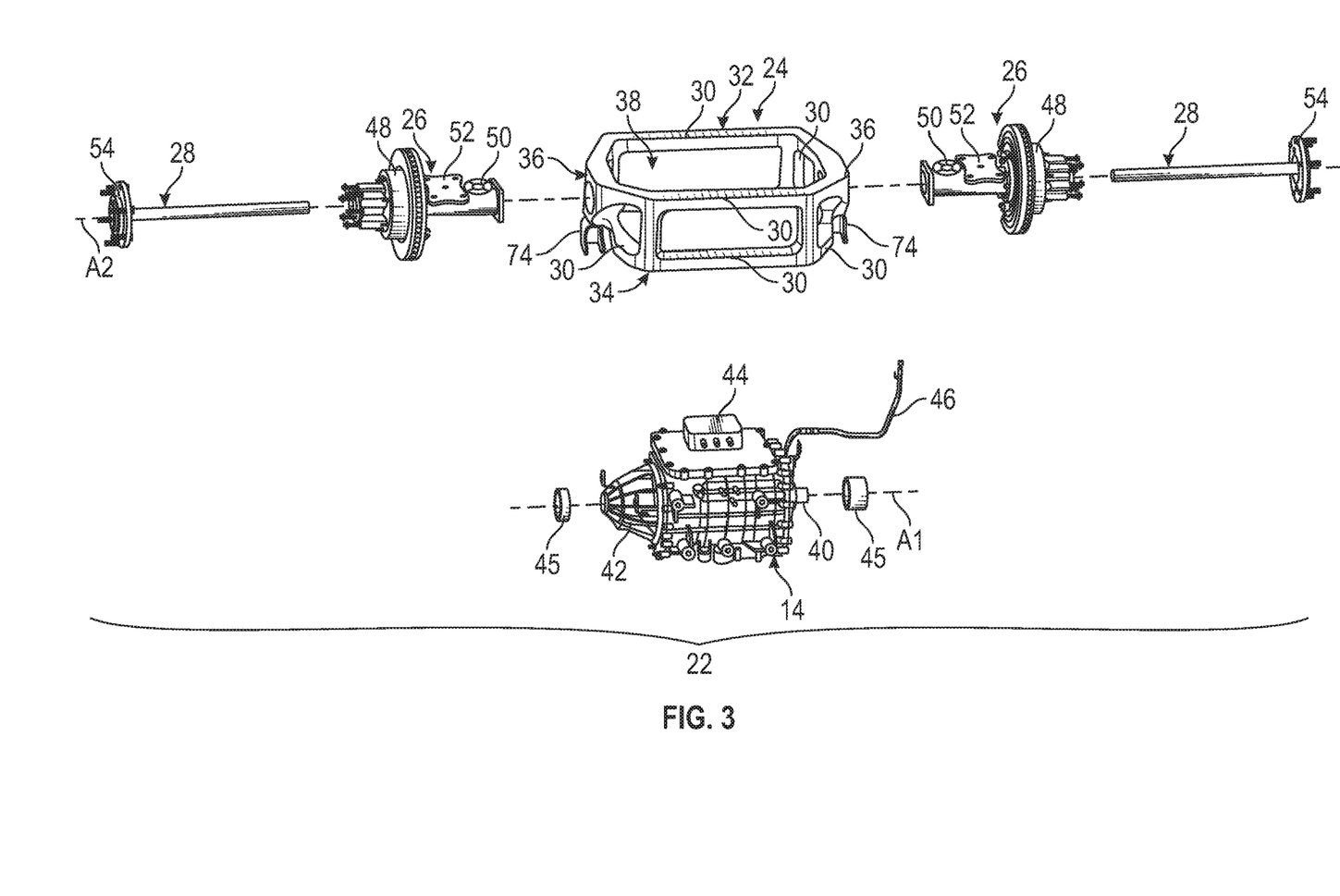
FIG. 3 is an exploded view of the axle assembly of FIG. 2.
Figure 4:
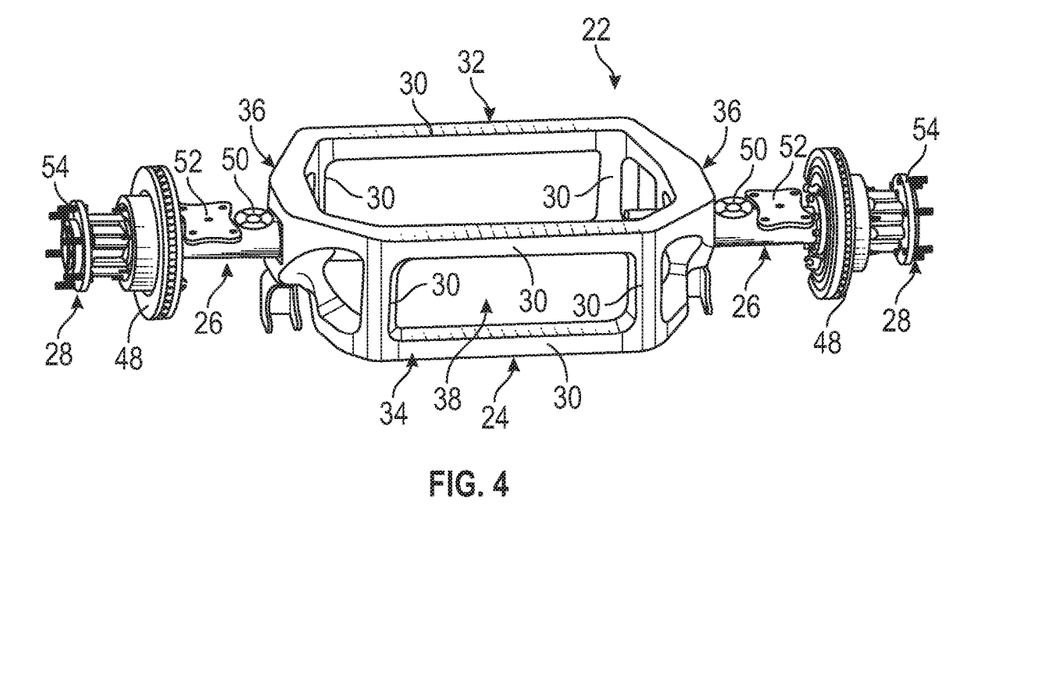
FIG. 4 illustrates the axle assembly of FIG. 2 but with the electric machine removed.

FIGS. 2, 3, and 4 illustrate an exemplary axle assembly 22 of the drive system 12 of the electrified vehicle 10 of FIG. 1. FIG. 2 is an assembled view of the axle assembly 22, and FIG. 3 is an exploded view of the axle assembly 22. The electric machine 14 is removed from the axle assembly 22 in FIG. 4 for clarity.

In an embodiment, the axle assembly 22 is a rear axle assembly of the electrified vehicle 10. In another embodiment, the axle assembly 22 is a front axle assembly of the electrified vehicle 10. In yet another embodiment, both front and rear axles of the drive system 12 could each employ the axle assembly 22. Stated another way, the electrified vehicle 10 could be a rear wheel drive vehicle, a front wheel drive vehicle, or an all-wheel drive vehicle.

The axle assembly 22 may include, among other things, a cradle 24, the electric machine 14, a pair of shaft housings 26, and a pair of axle shafts 28. These components are discussed in greater detail below.

The cradle 24 may function as a sub-frame of the axle assembly 22 and is configured for mounting the electric machine 14. The cradle 24 may be made of any high strength and lightweight material or combination of materials. The size, shape, material make-up, and overall configuration of the cradle 24 are not intended to limit this disclosure.

The cradle 24 may include a plurality of tubular members 30 that are arranged to establish a top frame 32, a bottom frame 34, and opposing side walls 36 of the cradle 24. A portion of the tubular members 30 may extend vertically between the top frame 32 and the bottom frame 34 in order to connect the top frame 32 to the bottom frame 34. The top frame 32, the bottom frame 34, and the side walls 36 of the cradle 24 establish an open space 38 for accommodating the electric machine 14.

The electric machine 14 may be securely mounted to the cradle 24. In an embodiment, the electric machine 14 is positioned within the open space 38 and then mechanically fastened to the cradle 24. High strength bolts or other types of fasteners may be used to mount the electric machine 14 to the cradle 24. The mounting locations of the fasteners relative to the electric machine 14 and the cradle 24 are not intended to limit this disclosure.

In an embodiment, once mounted to the cradle 24, an axis of rotation A1 of an output shaft 40 of the electric machine 14 is generally parallel to a longitudinal axis A2 of the axle assembly 22 (see FIGS. 2 and 3). Therefore, a complex gear set is not required to operably connect the electric machine 14 to the drive wheels 16 of the electrified vehicle 10.

The output shaft 40 of the electric machine 14 may interface with one of the opposing side walls 36 of the cradle 24 and an integrated differential 42 of the electric machine 14 may interface with the other of the opposing side walls 36 of the cradle 24 once the electric machine 14 is mounted within the cradle 24. In an embodiment, the electric machine 14 is an electric motor with the integrated differential 42.

Dampers 45 may be mounted between the electric machine 14 and the side walls 36 of the cradle 24. In an embodiment, one damper 45 is positioned between the output shaft 40 and one of the side wall 36 of the cradle 24 and another damper 45 is positioned between the differential 42 and the other of the side walls 36. The dampers 45 are configured to reduce the noise, vibration, and harshness (NVH) that may be transferred between the electric machine 14 and the electrified vehicle 10 and to reduce the road loads experienced by the electric machine 14. The dampers 45 may be tuned to provide different rates of dampening depending on the specific vehicle application, among other criteria.

An electronics housing 44 of the electric machine 14 may protrude outwardly of the top frame 32 of the cradle 24. In addition, a flexible wiring harness 46 may extend from the electric machine 14 to a location outside of the cradle 24 for connecting the electric machine 14 to the battery pack 20 (i.e., the establish the voltage bus 18 of FIG. 1).

One of the shaft housings 26 of the axle assembly 22 may be mounted to each of the opposing side walls 36 of the cradle 24. In an embodiment, the shaft housings 26 are bolted to the side walls 36 of the cradle 24. However, any suitable fastener may be used to mount the shaft housings 26 to the cradle 24.

Each shaft housing 26 may include a bearing 48. In an embodiment, the bearing 48 is an inner axle bearing that both supports the shaft housing 26 and facilitates rotation of the axle shaft 28 inside the shaft housing 26. Any type of bearing having an appropriate load carrying capacity may be utilized within the scope of this disclosure.

Each shaft housing 26 may additionally include a first mounting pad 50 and a second mounting pad 52. In an embodiment, the first mounting pad 50 is located nearer to the side wall 36 of the cradle 24 and the second mounting pad 52 is located further away from the side wall 36 of the cradle 24 in a mounted position of the shaft housing 26. As discussed in greater detail below, the first mounting pad 50 and the second mounting pad 52 provide surfaces for mounting a strut and a leaf spring assembly, respectively.

One of the axle shafts 28 may be inserted through each shaft housing 26. In an embodiment, a first of the axle shafts 28 connects to the output shaft 40 of the electric machine 14 and a second of the axle shafts 28 connects to the differential 42 of the electric machine 14. Each axle shaft 28 may include a wheel hub 54 for mounting the drive wheels 16 of FIG. 1 to the axle assembly 22. The axle shafts 28 are therefore configured to transfer the rotational output torque from the electric machine 14 to the drive wheels 16 of the electrified vehicle 10.

Figure 5:
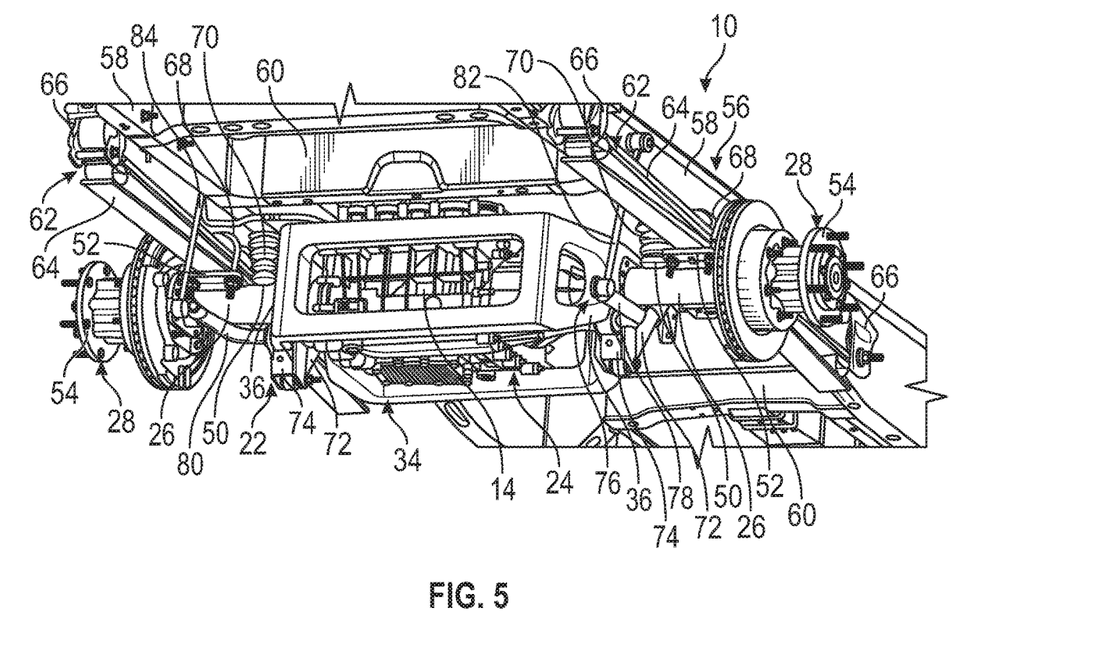
FIG. 5 illustrates the axle assembly of FIG. 2 mounted to a vehicle frame of an electrified vehicle.

FIG. 5, with continued reference to FIGS. 1-4, illustrates the axle assembly 22 mounted relative to a vehicle frame 56 of the electrified vehicle 10. The vehicle frame 56 may include two or more longitudinally extending frame members 58, which extend parallel to the length of the electrified vehicle 10, and two or more cross members 60, which extend transversely between the frame members 58.

A leaf spring assembly 62 may be mounted to each of the frame members 58 of the vehicle frame 56. Each leaf spring assembly 62 may include one or more leaf springs 64 and a mounting bracket 66 located at each end of the leaf spring assembly 62. The mounting brackets 66 are configured for mounting the leaf spring assembly 62 to the frame members 58 of the vehicle frame 56. The leaf spring assemblies 62 generally function to support the weight of the electrified vehicle 10. When mounted, the leaf springs 64 of the leaf spring assemblies 62 extend parallel to the frame members 58.

The axle assembly 22 may be mounted to each of the leaf spring assemblies 62. In an embodiment, the axle assembly 22 is mounted to each of the leaf spring assemblies 62 using one or more U-clamps 68. When mounted, the leaf springs 64 of the leaf spring assembly 62 are received against the second mounting pads 52 of the shaft housings 26. The U-clamps 68 may extend around the lead springs 64 and connect to openings formed in the second mounting pads 52.

Struts 70 may extend between the shaft housings 26 and the vehicle frame 56. In an embodiment, the struts 70 are mounted to the first mounting pads 50 of the shaft housings 26 and to the frame members 58 of the vehicle frame 56. The struts 70 generally function to brace and reinforce the axle assembly 22 and the vehicle frame 56.

Shocks 72 may extend between the cradle 24 of the axle assembly 22 and the vehicle frame 56. In an embodiment, the cradle 24 includes mounting brackets 74 for mounting the shocks 72 relative to the cradle 24. One mounting bracket 74 may be mounted to the bottom frame 34 beneath each side wall 36 of the cradle 24. The shocks 72 may extend diagonally away from the mounting brackets 74 and may be mounted at their opposite ends to the frame members 58 of the vehicle frame 56. The shocks 72 generally function to absorb and dampen oscillations at the vehicle frame 56 and at the axle assembly 22.

The axle assembly 22 may additionally include a stabilizer bar assembly 76. The stabilizer bar assembly 76 may include a first stabilizer bar portion 78 that is connected to the cradle 24 and a second stabilizer bar portion 80 that is connected to one of the shaft housings 26. The first and second stabilizer bar portions 78, 80 may form a single stabilizer bar or could be separate bar portions. The first and second stabilizer bar portions 78, 80 may extend in front of or behind the cradle 24.

A first stabilizer link 82 may be connected to the first stabilizer bar portion 78 and is mounted at an opposite end to one of the frame members 58 of the vehicle frame 56. A second stabilizer link 84 may be connected to the second stabilizer bar portion 80 and is mounted at an opposite end to another of the frame members 58 of the vehicle frame 56. Bushings may be positioned between the first and second stabilizer bar portions 78, 80 and the first and second stabilizer links 82, 84, respectively. The stabilizer bar assembly 76 generally functions to stabilize the axle assembly 22 relative to the vehicle frame 56 while allowing some twisting of the stabilizer bar assembly 76 when the axle assembly 22 is articulated unevenly (i.e., one wheel goes up or down and the other moves much less).

The exemplary drive system axle assemblies of this disclosure combine various powertrain and suspension components into a simple and cost effective solid axle packaging for providing an integrated electric machine that is suitably isolated from road loads and vibrations. The axle assemblies of this disclosure can be utilized within any type of electrified vehicle and are capable of meeting existing payload and versatility requirements.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A drive system for an electrified vehicle, comprising:
a leaf spring assembly; and an axle assembly mounted to the leaf spring assembly and including:
  a cradle;
  an electric machine mounted within the cradle;
  a shaft housing mounted to the cradle; and
  an axle shaft inserted through the shaft housing and connected to an output shaft of the electric machine.

2. The drive system as recited in claim 1, wherein the axle assembly is mounted to the leaf spring assembly by a U-clamp.

3. The drive system as recited in claim 1, wherein the cradle is comprised of a plurality of tubular members that are arranged to establish a top frame, a bottom frame, a first side wall, and a second side wall.

4. The drive system as recited in claim 3, comprising a first damper positioned between the electric machine and the first side wall and a second damper positioned between the electric machine and the second side wall.

5. The drive system as recited in claim 1, comprising a shock mounted to a mounting bracket of the cradle.

6. The drive system as recited in claim 1, comprising a strut mounted to a mounting pad of the shaft housing.

7. The drive system as recited in claim 1, comprising a stabilizer bar assembly connected to the cradle and the shaft housing.

8. The drive system as recited in claim 1, wherein a flexible wiring harness of the electric machine connects to a battery pack of the drive system.

9. The drive system as recited in claim 1, wherein the electric machine is an electric motor with an integrated differential.

10. The drive system as recited in claim 9, wherein the output shaft of the electric machine interfaces with a first side wall of the cradle and the integrated differential interfaces with a second side wall of the cradle.

* * * * *